Patented Dec. 25, 1951

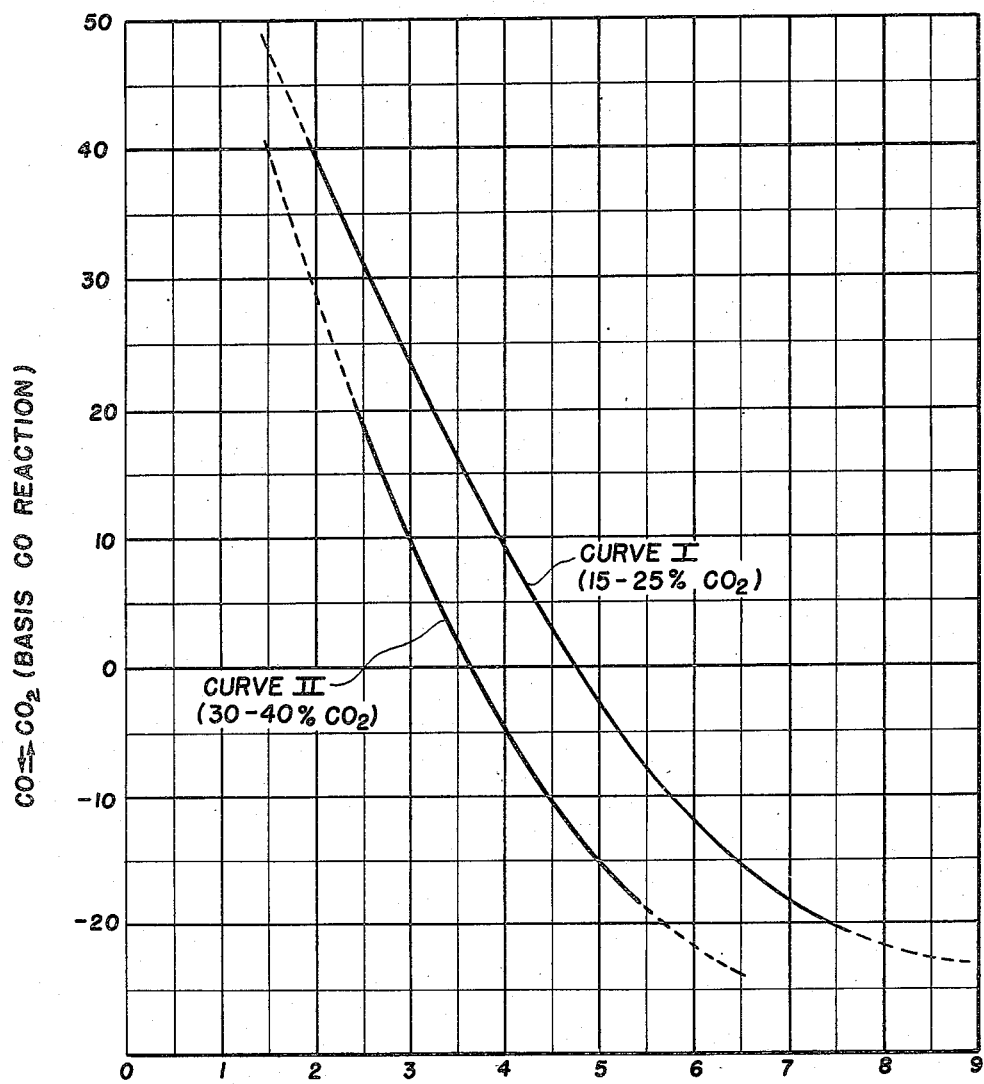

2,580,116

UNITED STATES PATENT OFFICE 2,580,116

SYNTHESIS OF ORGANIC COMPOUNDS

Henry G. McGrath, Elizabeth, and Louis C. Rubin, West Caldwell, N. J., assignors to The M. W. Kellogg Company, Jersey City, N. J., a corporation of Delaware Application December 27, 1948, Serial No. 67,391

12 Claims. (Cl. 260—449.6)

1

This invention relates to the hydrogenation of carbon monoxide to produce normally liquid organic compounds comprising hydrocarbons and oxygenated organic compounds. In one aspect the invention relates to the hydrogenation of carbon monoxide in the presence of carbon dioxide employing a finely-divided iron synthesis catalyst suspended in the reaction mixture.

Carbon monoxide may be hydrogenated in the presence of various catalysts to produce normally liquid organic compounds. Such catalysts comprise the metals of group 8 of the periodic table, including iron. In the preferred practice these catalysts are pulverized to a finely-divided form and substantially completely reduced to the elementary metal. The reduced and pulverized catalysts are suspended in the reactants hydrogen and carbon monoxide under appropriate conditions of temperature, pressure and space velocity such that normally liquid organic compounds are produced and recovered from the process. Although the conversion of carbon monoxide per pass in such suspended processes is relatively high as compared to fixed or stationary bed processes, difficulty is often encountered in maintaining the catalyst in suspension, particularly when an iron catalyst is being used, and in obtaining relatively high yields of liquid compounds and relatively low yields of carbon dioxide and gaseous compounds. According to this invention it has been found that the composition of the inlet feed to the reactor is of a critical nature with regard to the successful operation of the suspended type process and in recovery of high yields of normally liquid organic compounds.

It is an object of this invention to provide a process for the hydrogenation of carbon monoxide in the presence of a finely-divided suspended reduced iron catalyst.

Another object of this invention is to minimize the tendency of an alkali-containing iron catalyst in the synthesis process to deaerate and agglomerate under operating conditions when suspended in the reacting gases.

Still another object of this invention is to obtain the maximum utilization of carbon in the system.

It is yet another object of this invention to increase the selectivity of iron catalyst for the production of normally liquid organic compounds and to increase the efficiency of such processes generally.

Various other objects and advantages of this invention will become apparent to those skilled in the art from the accompanying description and disclosure.

According to this invention it has been found that in the hydrogenation of carbon monoxide to produce the optimum yield of normally liquid compounds in the presence of a finely-divided iron catalyst the total reaction feed mixture may contain as much as 30 mol per cent or more of carbon dioxide and should contain in all instances above 8 mol per cent carbon dioxide. It has further been found in the hydrogenation of carbon monoxide utilizing a suspended finely-divided iron catalyst that the concentration of carbon monoxide in the total reaction feed mixture should be maintained below about 17 mol per cent, preferably between about 8 and about 12 mol per cent. When operating in this manner the iron catalyst, particularly an alkali-containing reduced iron catalyst, may be maintained in suspension substantially continuously without deaeration and agglomeration and optimum yields of normally liquid organic compounds are obtained at a temperature between about 450° F. and about 750° F. generally below 650° F., preferably with a temperature between about 580 and about 625° F., at a pressure above about 80 pounds per square inch gage and at space velocities equivalent to at least 3, and preferably at least 10, standard cubic feet of carbon monoxide charged per hour per pound of iron. When operating in accordance with the above conditions at a conversion of at least 50 per cent of the carbon monoxide per pass, between about 80 and about 150 cc. or more of oil per cubic meter of fresh feed are produced.

The operations with an alkali-containing iron catalyst should be such that the carbon dioxide in the reaction mixture is consumed rather than produced, thus utilizing the carbon dioxide accompanying the fresh feed and converting same to organic compounds. The fresh feed which may be produced by methane reforming with steam or partial combustion of methane contains from about 1 to about 10 per cent carbon dioxide; the higher percentages within the above range obtained with methane reforming and lower percentages within the above range obtained with partial combustion. The quantity of carbon dioxide in the fresh feed plus the quantity of carbon dioxide of the recycle gases to the reaction zone is maintained during the synthesis proper such that between about 10 and about 20 mol per cent of carbon dioxide is present in the total feed to the reaction zone for best results. The mol ratios of hydrogen to carbon monoxide to carbon dioxide are preferably in a range of 8–2.5:1:1–2. If carbon dioxide consumption is desired, the mol ratio of hydrogen plus carbon dioxide to carbon monoxide, designated as the gas factor, should be at least 5 when the carbon dioxide content of the total feed is about 15 mol per cent or lower as shown by curve I of the drawing. For example, a suitable reaction mixture comprises 10 per cent carbon monoxide, 15 per cent carbon dioxide and about 60 per cent hydrogen, the remainder being methane and other hydrocarbons and nitrogen.

When operating with a relatively high carbon dioxide content, such as 30 to 40 mol per cent, in the total reaction feed mixture, carbon dioxide is consumed at lower gas factors, as indicated by curve II of the accompanying drawing. At relatively low carbon dioxide contents, higher gas factors are necessary to obtain consumption of the carbon dioxide. With increases in carbon monoxide conversion a lower gas factor may be used for a given carbon dioxide content to obtain carbon dioxide consumption. Alternatively, at a given gas factor, carbon dioxide consumption increases with increases in carbon monoxide conversion. Appropriate conversions are maintained by controlling such factors as the space velocity and temperature of reaction. In general, with greater gas factors increases in normally liquid organic compounds are obtained together with increased consumption of carbon dioxide.

The reaction mixture comprising hydrogen, carbon monoxide and carbon dioxide within the aforementioned ratio is passed upwardly through a reaction zone containing a finely-divided reduced iron catalyst. The gas stream is passed upwardly through a reaction zone at a velocity within the range of about 0.1 to about 50 feet per second to maintain the finely-divided catalyst in suspension in the gas stream. As velocities below about 5 feet per second in the above range the catalyst is maintained in the reaction zone in high concentration and assumes a fluidized pseudo-liquid condition as described in our co-pending application Ser. No. 690,820, filed August 15, 1946, now abandoned. At higher velocities the dense fluidized condition is not present and the catalyst concentration is considerably less than in a dense phase type of operation and usually is lower than about 25 pounds per cubic foot. This type of operation at higher velocities is described in co-pending application Ser. No. 726,620, by Henry G. McGrath and Luther R. Hill, filed February 5, 1947.

The catalyst employed in the process of this invention is a finely-divided powder consisting essentially of reduced iron which is or becomes in the reaction zone a catalyst for the reaction. While the catalyst powder consists essentially of reduced iron, it may also include a minor amount of promoting ingredients such as alkali metals and alkaline earth metals, alumina, silica, titania, thoria, manganese oxide, magnesia, etc. The iron catalyst may be prepared by the fusion of Alan Wood ore with the promoter, pulverizing the fused material and reducing the pulverized material at a relatively low temperature at elevated pressures, preferably at a temperature below 700° F. and a pressure above 100 pounds per square inch gage. The composition and preparation of various types of iron catalysts is disclosed and claimed in our prior and co-pending application Ser. No. 735,536, filed March 18, 1947, now Patent Number 2,543,327, issued February 27, 1951.

The exact chemical condition of the catalyst in its most active form is not certain. It may be that the active form is present when the metal is in an optimum degree of oxidation or carburization. Consequently, the powdered catalyst, which is in a substantially completely reduced condition when first contacted with the reactants, may reach its state of highest activity through being oxidized and/or carburized in the reaction zone. Therefore, in this specification and claims the catalyst employed is described by reference to its chemical condition when first contacted with the reactants.

The catalyst is employed in a fine state of subdivision. Preferably the powdered catalyst initially contains no more than a minor proportion by weight of material whose particle size is greater than 250 microns. Preferably also the greater proportion of the catalyst mass comprises material whose particle size is smaller than 100 microns, including at least 25 weight per cent of the material in particle sizes smaller than 37 microns. A highly desirable powdered catalyst comprises at least 75 per cent by weight of material smaller than 150 microns in particle size, and at least 25 per cent by weight smaller than 37 microns in particle size.

The reactants are passed into and through the reaction zone at a space velocity equivalent to at least 3.0 standard cubic feet of the carbon monoxide per hour per pound of metal catalyst in the dense catalyst phase. In the hydrogenation of carbon monoxide in the presence of the iron catalyst it is preferred to maintain a space velocity equivalent to at least 10 standard cubic feet of carbon monoxide per hour per pound of iron catalyst in the dense catalyst phase.

The reaction gas mixture may consist entirely of hydrogen, carbon monoxide and carbon dioxide but may include, in addition, other relatively non-reactive ingredients such as nitrogen and hydrocarbon gases such as methane, ethane and propane.

In connection with the present invention it has been discovered that the conversion operation carried out in the manner described above can be extended substantially indefinitely without the necessity for catalyst regeneration by careful control of the ratio of hydrogen to carbon monoxide to carbon dioxide. In the foregoing operation the metal catalyst accumulates carbonaceous deposits including tarry material, waxy materials, hydrocarbon liquids and oxygenated compounds of high molecular weight. It is found that these deposits continue to accumulate on the catalyst at a rate and to a final percentage which is affected by the temperature and the ratio of hydrogen to carbon monoxide in the charge gas mixture. It has been found, when operating at temperatures effective for a high conversion rate, that the lower the gas factor the more rapid will be the accumulation of carbonaceous deposits on the catalyst surface and the higher will be the percentage of the catalyst mass represented by carbonaceous deposits when equilibrium conditions are reached.

Conveniently, the high ratio of $H_2 : CO : CO_2$ may be maintained in the charge gas mixture by the combined effect of supplying a fresh feed gas mixture containing hydrogen and carbon monoxide in a relatively high ratio and recycling unconverted gases to form a composite charge gas mixture having the desired ratio of hydrogen to carbon monoxide to carbon dioxide. In the hydrogenation of carbon monoxide by the manner described above substantially all of the carbon monoxide of the charge gas mixture and a substantial proportion of the carbon dioxide are reacted during the passage of the charge gas through the reaction zone. Consequently, the unconverted gas contains hydrogen in an $H_2 : CO : CO_2$ ratio substantially greater than in the charge gas. By recycling such unconverted gas in combination with a fresh feed containing $H_2$ and CO in a lower ratio than that desired in the charge gas and containing some carbon dioxide, a composite charge gas mixture having the desired ratio may be prepared.

The gases to be recycled may be obtained from the reaction product by a simple preliminary cooling of the product which separates only the more readily separable liquid reaction products, or the recycle gases may be obtained from the product gas after extensive condensation treatment to remove substantially all condensable hydrocarbons and oxygenated compounds. For example, a composite charge gas mixture may be formed by combining a fresh feed mixture having an $H_2 : CO : CO_2$ ratio of about 2.9:1:0.3 with a recycle gas stream containing essentially no carbon monoxide to produce a composite feed containing hydrogen, carbon monoxide and carbon dioxide in a ratio of about 5.3:1:1.2. A portion of the unconverted gases is discarded from the system to prevent the accumulation of inerts, such as nitrogen, and the remainder may be recycled in an amount effective to produce the desired ratio in the composite charge gas.

The principal effect of a high gas factor on the reaction product is the substantial elimination of $CO_2$ as a product. In previous operations employing $H_2 : CO$ ratios heretofore considered desirable, about 40 per cent of the CO converted appeared in the product as $CO_2$. In the practice of this invention it has been possible to avoid any production of $CO_2$ and even effect consumption of $CO_2$ in the feed gas.

The following table shows runs made according to the teachings of this invention with a synthesis feed mixture containing hydrogen, carbon monoxide and carbon dioxide employing an alkali-containing reduced iron catalyst suspended in the reaction gases. In general, the catalyst for each run was a reduced iron catalyst containing between about 0.3 and about 1.5 alkali calculated as potassium oxide based on Fe. The catalyst was prepared from a naturally occurring magnetite, Alan Wood ore, by admixing a predetermined amount of potassium carbonate with the ore, then fusing the mixture, pulverizing the fused material to the desired size as previously mentioned, and reducing the finely-divided fused material in a stream of hydrogen at relatively low temperatures until substantially completely reduced as evidenced by the cessation of the formation of water.

These runs were made in the reactors described in the aforesaid applications Serial Nos. 690,820 and 726,620 in which a detailed description of the equipment and operating techniques employed is set forth. Both dense phase and high velocity systems were employed as indicated in the table for each run.

The table is in conventional tabular form and is self-explanatory. All of the runs were successful with good yields of oil and with no difficulty encountered in maintaining the catalyst in a suspended condition.

*Table of operating conditions and results*

|  | A | B | C | D | E | F | G | H | I | J | K | L | M |
|---|---|---|---|---|---|---|---|---|---|---|---|---|---|
| Operating Conditions: | | | | | | | | | | | | | |
| Catalyst Age, Hrs | 579 | 1114 | 373 | 660 | 283 | 202 | 187 | 298 | 434 | 512 | 578 | 746 | 300 |
| Catalyst Temp. ° F. (Aver.) | 539 | 585 | 560 | 587 | 589 | 594 | 597 | 604 | 621 | 612 | 630 | 633 | 601 |
| Reactor Outlet Pressure, P. s. i. g | 250 | 255 | 247 | 398 | 249 | 251 | 250 | 250 | 250 | 250 | 250 | 250 | 250 |
| Catalyst, Wt. Per Cent $K_2O$ | 0.6 | 0.6 | 0.3 | 1.4 | 1.4 | 1.2 | 1.1 | 1.1 | 1.1 | 1.1 | 1.1 | 1.1 | 1.2 |
| Reactor Conditions: | | | | | | | | | | | | | |
| Height of Catalyst Bed, Feet | 14.5 | 11.9 | 10.5 | 20.8 | 20.6 | 7.0 | 5.1 | 4.5 | 8.5 | 8.9 | 9.5 | 11.3 | 18.0 |
| Catalyst Density, lb/cu. ft | 48.0 | 47.0 | 52.0 | 45 | 51 | 73 | 69 | 69 | 45 | 43 | 42 | 47 | 47 |
| Gas Velocity, Ft./Sec | 0.81 | 0.53 | 0.92 | 0.89 | 1.02 | 1.6 | 1.5 | 1.58 | 2.00 | 2.02 | 2.06 | 1.85 | 1.27 |
| Space Velocity, S. C. F. of CO/hr./# of Catalyst | 7 | 13.5 | 17.0 | 6.7 | 7.5 | 5.9 | 10.5 | 7.7 | 12.6 | 13.4 | 14.1 | 13.6 | 8.0 |
| Gas Throughput: | | | | | | | | | | | | | |
| Total Gas Inlet S. C. F./hr | 636.0 | 410.7 | 697.4 | 954.5 | 725.0 | 1,094.4 | 993.1 | 959.3 | 1,316.5 | 1,327.8 | 1,307.2 | 1,161.4 | 832.7 |
| Composition of Total Inlet, Mol Per Cent: | | | | | | | | | | | | | |
| $CO_2$ | 13.7 | 8.3 | 23.2 | 10.2 | 19.0 | 8.2 | 9.6 | 8.0 | 10.7 | 10.0 | 10.5 | 10.2 | 20 |
| CO | 14.9 | 16.5 | 17.3 | 11.5 | 16.1 | 8.5 | 15.2 | 11.4 | 12.4 | 13.0 | 13.8 | 14.8 | 17 |
| $H_2$ | 50.4 | 54.1 | 40.7 | 43.6 | 47.0 | 56.1 | 69.8 | 75.1 | 67.5 | 71.2 | 67.9 | 68.3 | 39 |
| $CH_4$ | 14.7 | 16.8 | 13.6 | 23.1 | 13.2 | 16.4 | 3.6 | 3.7 | 5.6 | 2.8 | 5.2 | 4.5 | 17 |
| $N_2$ | | | 0.7 | | 0.3 | | | | | | | 0.2 | |
| Gas Factor = $H_2 + CO_2/CO$ | 4.3 | 3.8 | 3.7 | 4.7 | 4.1 | 7.6 | 5.2 | 7.3 | 6.3 | 6.6 | 5.7 | 5.3 | 3.5 |
| Composition of Fresh Feed, Mol Per Cent: | | | | | | | | | | | | | |
| $CO_2$ | 1.2 | 1.2 | 6.1 | 3.1 | 1.7 | 4.0 | 7.3 | 5.3 | 6.3 | 6.3 | 7.0 | 6.0 | 1.1 |
| CO | 32.1 | 29.2 | 34.1 | 27.3 | 36.8 | 25.5 | 22.1 | 13.8 | 22.5 | 21.8 | 22.0 | 23.7 | 39.2 |
| $H_2$ | 62.8 | 62.7 | 55.9 | 58.0 | 57.8 | 69.8 | 69.5 | 75.2 | 70.3 | 70.6 | 69.9 | 69.3 | 55.2 |
| $CH_4$ | 3.7 | 6.4 | 3.1 | 10.5 | 3.1 | 0.6 | 1.1 | 0.6 | 0.9 | 1.0 | 1.1 | 0.9 | 4.2 |
| Fresh Feed S. C. F./hr | 220 | 211 | 308 | 194 | 309 | 107.4 | 285.3 | 249.0 | 289.2 | 289.2 | 296.2 | 274.4 | 307.6 |
| Results, (Basis Fresh Feed): | | | | | | | | | | | | | |
| Per Cent CO Conversion (disappearance) | 100.0 | 100.0 | 100.0 | 91.2 | 99.2 | 95.9 | 67.2 | 74.7 | 84.5 | 76.8 | 72.1 | 73.9 | 100 |
| CO → $CO_2$ | 17.0 | 15.7 | 18.3 | 9.8 | 24.1 | −9.2 | −2.0 | 2.3 | −4.6 | −1.7 | −0.3 | 3.6 | 24.5 |
| CO → $CH_4$ | 8.2 | 13.0 | 9.4 | 6.0 | 7.8 | 11.5 | 7.8 | 11.6 | 7.8 | 2.6 | 10.7 | 9.6 | 6.4 |
| CO → Condensed Oil | 14.5 | 12.7 | 29.8 | 18.7 | 25.6 | 21.1 | 10.4 | 9.8 | 13.2 | 14.4 | 14.5 | 11.5 | 18.6 |
| CO → Oxygenated Cpds | 13.3 | 18.9 | 4.7 | 15.3 | 13.7 | 14.7 | 9.6 | 10.1 | 11.5 | 11.5 | 12.1 | 10.7 | 14.1 |
| CO → Oil and Wax on Catalyst | | | 0.9 | 0.3 | | 0.1 | Trace | 0.2 | 0.1 | 0.1 | 0.1 | | 0.1 |
| CO → Wax | | | 1.0 | 1.7 | 1.9 | 3.2 | 2.2 | 1.7 | 3.1 | 3.4 | 3.9 | 3.0 | 1.6 |
| Condensed Oil, cc/m³F. F | 137 | 115 | 159 | 132 | 139 | 98 | 65 | 63 | 94 | 100 | 90 | 74 | 180 |
| Water, cc/m³F. F | 125 | 118 | 133 | 93 | 121 | 210 | 77 | 96 | 120 | 116 | 108 | 95 | 136 |
| Recycle Gas Composition, Mol Per Cent: | | | | | | | | | | | | | |
| $CO_2$ | 20.4 | 16.1 | 37.2 | 12.1 | 31.8 | 8.7 | 10.6 | 9.0 | 11.9 | 11.0 | 11.6 | 11.5 | 32 |
| CO | 5.6 | 2.3 | 3.4 | 7.5 | 0.8 | 6.6 | 12.4 | 8.7 | 9.5 | 10.5 | 11.4 | 12.0 | 5 |
| $H_2$ | 43.8 | 44.8 | 28.1 | 39.8 | 39.0 | 54.6 | 69.9 | 75.0 | 66.7 | 71.4 | 67.3 | 68.0 | 30 |
| $CH_4$ | 20.5 | 28.4 | 19.4 | 26.3 | 18.0 | 17.9 | 4.2 | 4.2 | 5.8 | 2.8 | 5.6 | 5.1 | 20 |
| $C_2+$ | 9 | 8 | 1.3 | | 0.4 | 11 | 3 | 3 | 6 | 4 | 4 | 3 | 12 |
| $N_2$ | | | | | | | | | | | | 0.2 | |
| Recycle Ratio, Recycle/F. F. (Vol.) | 1.8 | 0.9 | 1.22 | 3.9 | 1.35 | 9.19 | 2.5 | 2.8 | 3.6 | 3.6 | 3.4 | 3.2 | 1.8 |

Table of operating conditions and results—Continued.

| | N | O | P | Q | R | S | T | U | V | W | X | Y | Z |
|---|---|---|---|---|---|---|---|---|---|---|---|---|---|
| Operating Conditions: | | | | | | | | | | | | | |
| Catalyst Age, Hrs | 738 | 395 | 819 | 489 | 465 | 56 | 74 | 122 | 189 | 213 | 138 | 238 | 262 |
| Catalyst Temp. °F. (Aver.) | 626 | 603 | 641 | 625 | 600 | 585 | 595 | 580 | 590 | 585 | 600 | 605 | 610 |
| Reactor Outlet Pressure, P. s. i. g | 251 | 250 | 250 | 250 | 250 | 79 | 121 | 250 | 250 | 250 | 251 | 250 | 250 |
| Catalyst, Wt. Per Cent $K_2O$ | 1.3 | 1.5 | | | | | | 1.5 | | | | | |
| Reactor Conditions: | | | | | | | | | | | | | |
| Height of Catalyst Bed, Feet | 21.1 | 18.2 | (¹) | (¹) | (¹) | (¹) | (¹) | (¹) | (¹) | (¹) | (¹) | (¹) | (¹) |
| Catalyst Density, lb/cu. ft | 41 | 40 | 26.8 | 11.6 | 11.3 | 5.3 | 5.3 | 3.9 | 9.9 | 13.0 | 23.8 | 17.7 | 17.3 |
| Gas Velocity, Ft./Sec | 1.02 | 0.77 | 5.2 | 6.4 | 5.8 | 4.7 | 5.0 | 5.5 | 5.7 | 5.3 | 5.6 | 5.6 | 5.4 |
| Space Velocity, S. C. F. of CO/hr./# of Catalyst | 3.5 | 7.0 | 31 | 64 | 42 | 37 | 55 | 184 | 55 | 70.5 | 19.0 | | |
| Gas Throughput: | | | | | | | | | | | | | |
| Total Gas Inlet S. C. F./hr | 700.0 | 539.4 | 1,927 | 2,392 | 2,330 | 652 | 1,015 | 2,227 | 2,272 | 2,150 | 2,304 | 2,326 | 2,169 |
| Composition of Total Inlet, Mol Per Cent | | | | | | | | | | | | | |
| $CO_2$ | 22.0 | 28.6 | 45 | 18.1 | .8 | 11.5 | 11.4 | 10.2 | 12 | 27.3 | 9.7 | 16.0 | 25.0 |
| CO | 17.5 | 15.6 | 15.2 | 11.9 | 7.6 | 11.4 | 10.6 | 11.9 | 8.7 | 15.7 | 8.2 | 9.3 | 13.0 |
| $H_2$ | 35.7 | 39.1 | 26.3 | 47.2 | 54.6 | 6.45 | 59.8 | 60.8 | 51.3 | 37.8 | 47.2 | 42.1 | 39.5 |
| $CH_4$ | 17.2 | 11.1 | 6.6 | 13.5 | 18.1 | 8.0 | 11.5 | 11.7 | 18.6 | 12.0 | 24.4 | 20.1 | 13.4 |
| $N_2$ | 0.1 | 1.2 | 1.3 | | | | | | 0.8 | 0.7 | | 1.0 | 1.9 |
| Gas Factor = $H_2 + CO/2CO$ | 3.2 | 4.3 | 4.7 | 5.5 | 8.2 | 6.7 | 6.7 | 6.0 | 7.3 | 4.1 | 6.9 | 6.3 | 5.0 |
| Composition of Fresh Feed, Mol Per Cent: | | | | | | | | | | | | | |
| $CO_2$ | 2.5 | 7.2 | 17.4 | 8.0 | 5.6 | 8.2 | 6.4 | 6.1 | 7.7 | 13.7 | 6.3 | 8.8 | 12.4 |
| CO | 39.0 | 33.8 | 31.4 | 26.8 | 22.5 | 19.8 | 23.4 | 22.8 | 21.0 | 25.0 | 22.8 | 22.5 | 24.5 |
| $H_2$ | 1.2 | 55.4 | 49.1 | 63.3 | 70.0 | 69.8 | 68.0 | 68.6 | 68.6 | 56.4 | 67.7 | 64.8 | 58.8 |
| $CH_4$ | | 2.9 | 2.1 | 1.9 | 1.9 | 2.0 | 2.2 | 2.2 | 2.2 | 4.5 | 3.2 | 3.6 | 4.3 |
| Fresh Feed S. C. F./hr | 252.4 | 160.7 | 387 | 438 | 311 | 202 | 226 | 336 | 384 | 242 | 552 | 550 | 534 |
| Results, (Basis Fresh Feed): | | | | | | | | | | | | | |
| Per Cent CO Conversion (disappearance) | 99.1 | 98.5 | 86 | 91 | 94.3 | 80 | 85 | 75 | 87.1 | 72.8 | 96.1 | 93.7 | 85.8 |
| CO → $CO_2$ | 24.5 | 12.3 | 8.0 | −8.9 | −16.5 | −2.8 | −0.1 | −0.1 | −10.9 | −0.3 | −15.8 | −17.3 | −6.2 |
| CO → $CH_4$ | 17.5 | 2.9 | 2.8 | 9.4 | 13.5 | 22.3 | 20.7 | 23.1 | 33.5 | 6.4 | 20.1 | 14.7 | 7.3 |
| CO → Condensed Oil | 8.5 | 25.2 | 29.3 | 21.2 | 17.8 | 2.4 | 8.8 | 7.7 | 17.8 | 16.8 | 43.9 | 41.0 | 33.3 |
| CO → Oxygenated Cpds. | 0.9 | 18.1 | 18.6 | 16.5 | 14.7 | 1.0 | 1.2 | 1.2 | 1.8 | 1.3 | 1.3 | 8.3 | 6.7 |
| CO → Oil and Wax on Catalyst | Trace | | 13.8 | | | | | | 0.1 | 0.2 | 0.1 | | 0.2 |
| CO → Wax | 0.1 | 6.7 | 2.0 | 1.3 | 0.9 | | | | | | 1.2 | 1.3 | 2.6 |
| Condensed Oil, cc/m³F. F. | 148 | 139 | 124 | 135 | 109 | 92 | 115 | 91 | 114 | 105 | 171 | 151 | 148 |
| Water, cc/m³F. F. | 118 | 139 | 146 | 190 | 217 | 114 | 148 | 131 | 168 | 136 | 216 | 201 | 170 |
| Recycle Gas Composition, Mol Per Cent: | | | | | | | | | | | | | |
| $CO_2$ | 33.1 | 44.6 | 51.7 | 20.4 | 8.2 | 12.8 | 12.9 | 10.9 | 12.8 | 29.1 | 10.8 | 18.3 | 29.1 |
| CO | 5.2 | 2.0 | 11.2 | 8.6 | 5.3 | 7.5 | 7.0 | 10.0 | 6.2 | 14.5 | 3.6 | 5.3 | 9.3 |
| $H_2$ | 23.5 | 26.9 | 20.7 | 43.4 | 52.2 | 62.1 | 57.4 | 59.3 | 47.9 | 35.3 | 40.8 | 35.7 | 33.3 |
| $CH_4$ | 22.0 | 15.3 | 7.7 | 16.1 | 20.6 | 10.9 | 14.1 | 13.4 | 21.9 | 13.0 | 31.0 | 25.5 | 16.3 |
| $C_2+$ | 15 | 4 | 6 | 11 | 13 | 6 | 7 | 6 | 9 | 6 | 13 | 13 | 9 |
| $N_2$ | 0.1 | 2.0 | 1.5 | | | | | | 0.7 | 0.8 | | | |
| Recycle Ratio, Recycle/F. F. (Vol.) | 1.78 | 2.36 | 3.98 | 4.5 | 6.5 | 2.2 | 3.5 | 5.6 | 4.9 | 7.9 | 3.17 | 3.23 | 3.06 |

¹ Continuous Catalyst Phase.

Various modifications and alterations of the invention may become apparent to those skilled in the art without departing from the scope thereof. The invention resides in critical limits for the composition of the total feed to the synthesis reactor when using a finely-divided synthesis catalyst in a suspended condition. The invention is not to be confused with the composition of the reaction feed mixture during relatively short periods of regeneration or conditioning of the catalyst. It is intended that the composition of the total feed as set forth herein be maintained substantially continuously during the synthesis proper in which the optimum quantity of desired products, such as normally liquid organic compounds, are being produced. This application is a continuation-in-part of our prior and copending application Serial No. 690,820, filed August 15, 1946, and application Serial No. 729,878, filed February 20, 1947.

We claim:

1. In a process for effecting the conversion of hydrogen and carbon oxides to normally liquid organic compounds in the presence of a finely-divided alkali-containing reduced iron synthesis catalyst having no more than a minor proportion by weight of material whose particle size is greater than 250 microns, in which process a total reaction feed mixture comprising hydrogen, carbon monoxide and carbon dioxide is passed upwardly through a reaction zone containing said catalyst at a velocity effective to suspend the finely-divided catalyst in the gases in a dense fluidized pseudo-liquid condition at an effective reaction temperature between about 580 and about 650° F., and a pressure above about 80 pounds per square inch gage and a space velocity equivalent to at least 3.0 standard cubic feet of carbon monoxide per pound of iron per hour, the improvement which comprises employing a total reaction feed mixture of a sufficiently low concentration of carbon monoxide between about 8 and about 17 mol per cent and of a sufficiently high concentration of carbon dioxide of between about 8 and about 30 mol per cent and a sufficiently high conversion of carbon monoxide of at least 50 per cent per pass and a hydrogen to carbon monoxide mol ratio of at least about 2.5:1 to minimize the formation of carbon dioxide and the tendency of the iron catalyst to deaerate and agglomerate, and recycling gaseous components including hydrogen and carbon dioxide of the reaction effluent in an amount effective to maintain the composition of the total reaction feed mixture including fresh feed within the above limitations.

2. In a process for effecting the conversion of hydrogen and carbon oxides to normally liquid organic compounds in the presence of a finely-divided alkali-containing reduced iron synthesis catalyst having no more than a minor proportion by weight of material whose particle size is greater than 250 microns, in which process a total reaction feed mixture comprising hydrogen, carbon monoxide and carbon dioxide is passed upwardly through a reaction zone containing said catalyst at a velocity effective to suspend the finely-divided catalyst in the gases at an effective reaction temperature between about 539° F. and about 650° F., and a pressure above about 80 pounds per square inch gage, the improvement which comprises employing a total reaction feed mixture of a sufficiently low concentration of carbon monoxide between about 8 and about 17 mol per cent and of a sufficiently high concentration of carbon dioxide of between about 8 and about 30 mol per cent and a sufficiently high conversion of carbon monoxide of at least 50 per cent per pass and a hydrogen to carbon monoxide mol ratio of at least about 2.5:1 to minimize the formation of carbon dioxide and the tendency of the iron catalyst to deaerate and agglomerate, and recycling gaseous components including hydrogen and carbon dioxide of the reaction effluent in an amount effective to maintain the composition of the total reaction feed mixture including fresh feed within the above limitations.

3. In a process for effecting the conversion of hydrogen and carbon oxides to normally liquid organic compounds in the presence of a finely-divided alkali-containing reduced iron synthesis catalyst having no more than a minor proportion by weight of material whose particle size is greater than 250 microns, in which process a total reaction feed mixture comprising hydrogen, carbon monoxide and carbon dioxide is passed upwardly through a reaction zone containing said catalyst at a velocity effective to suspend the finely-divided catalyst in the gases at an effective reaction temperature between about 539° F. and about 650° F., and a pressure above about 80 pounds per square inch gage, the improvement which comprises employing a total reaction feed mixture of a sufficiently low concentration of carbon monoxide between about 8 and about 17 mol per cent and of a sufficiently high concentration of carbon dioxide of between about 8 and about 30 mol per cent and a sufficiently high conversion of carbon monoxide of at least 50 per cent per pass and a hydrogen to carbon monoxide mol ratio of at least about 2.5:1 to minimize the formation of carbon dioxide and the tendency of the iron catalyst to deaerate and agglomerate.

4. In a process for effecting the conversion of hydrogen and carbon oxides to normally liquid organic compounds in the presence of a finely-divided alkali-containing reduced iron synthesis catalyst having no more than a minor proportion by weight of material whose particle size is greater than 250 microns, in which process a total reaction feed mixture comprising hydrogen, carbon monoxide and carbon dioxide is passed upwardly through a reaction zone containing said catalyst at a velocity effective to suspend the finely-divided catalyst in the gases in a dense fluidized pseudo-liquid condition at an effective reaction temperature between about 580 and about 650° F., a pressure above about 80 pounds per square inch gage and a space velocity equivalent to at least 3.0 standard cubic feet of carbon monoxide per pound of iron per hour, the improvement which comprises employing a total reaction feed mixture of a sufficiently low concentration of carbon monoxide between about 8 and about 17 mol per cent and of a sufficiently high concentration of carbon dioxide of between about 8 and about 30 mol per cent and a hydrogen to carbon monoxide mol ratio of at least about 2.5:1 to minimize the tendency of the iron catalyst to deaerate and agglomerate, and recycling gaseous components including hydrogen and carbon dioxide of the reaction effluent in an amount effective to maintain the composition of the total reaction feed mixture including fresh feed within the above limitations.

5. In a process for effecting the conversion of hydrogen and carbon oxides to normally liquid organic compounds in the presence of a finely-divided alkali-containing reduced iron synthesis catalyst having no more than a minor proportion by weight of material whose particle size is greater than 250 microns, in which process a total reaction feed mixture comprising hydrogen, carbon monoxide and carbon dioxide is passed upwardly through a reaction zone containing said catalyst at a velocity effective to suspend the finely-divided catalyst in the gases at an effective reaction temperature between about 539° F. and about 650° F., and a pressure above about 80 pounds per square inch gage, the improvement which comprises employing a total reaction feed mixture of a sufficiently low concentration of carbon monoxide between about 8 and about 17 mol per cent and of a sufficiently high concentration of carbon dioxide of between about 8 and about 30 mol per cent and a hydrogen to carbon monoxide mol ratio of at least about 2.5:1 to minimize the tendency of the iron catalyst to deaerate and agglomerate.

6. In a process for effecting the conversion of hydrogen and carbon oxides to normally liquid organic compounds in the presence of a finely-divided alkali-containing reduced iron synthesis catalyst having no more than a minor proportion by weight of material whose particle size is greater than 250 microns, in which process a total reaction feed mixture comprising hydrogen, carbon monoxide and carbon dioxide is passed upwardly through a reaction zone containing said catalyst at a velocity effective to suspend the finely-divided catalyst in the gases in a dense fluidized pseudo-liquid condition at an effective reaction temperature between about 580 and about 650° F., a pressure above about 80 pounds per square inch gage and a space velocity equivalent to at least 3.0 standard cubic feet of carbon monoxide per pound of iron per hour, the improvement which comprises employing a total reaction feed mixture of a sufficiently low concentration of carbon monoxide between about 8 and about 17 mol per cent and of a sufficiently high concentration of carbon dioxide between about 8 and about 30 mol per cent and a hydrogen to carbon monoxide mol ratio of at least about 2.5:1 to minimize the tendency of the iron catalyst to deaerate and agglomerate.

7. The process of claim 6 in which a gas factor $$\left(\frac{H_2+CO_2}{CO}\right)$$

of the total reaction feed mixture of at least about 5 is maintained.

8. The process of claim 6 in which the mol ratio of $H_2 : CO : CO_2$ is in the range of 8–2.5:1:1–2.

9. The process of claim 6 in which a gas factor $$\left(\frac{H_2+CO_2}{CO}\right)$$

of the total reaction feed mixture of at least about 5 is maintained and the mol ratio of $H_2 : CO : CO_2$ is in the range of 8–2.5:1:1–2.

10. A process for the conversion of hydrogen and carbon monoxide to organic compounds which comprises passing into an elongated reaction zone a total reaction feed mixture containing hydrogen, carbon monoxide, and carbon dioxide present in a mol ratio of 8–2.5:1:1–2, the carbon dioxide content of said feed mixture being between about 15 and about 25 mol per cent and the carbon monoxide content of said feed mixture being between about 8 and about 12 mol per cent and the gas factor $$\left(\frac{H_2+CO_2}{CO}\right)$$

of said feed mixture being above about 5, passing said feed mixture in contact with a finely-divided reduced iron catalyst containing a promotional amount of an alkali upward through said elongated reaction zone at a gas velocity effective to suspend said catalyst in the gases such that the catalyst is continuously moved in the direction of flow of said gases at a temperature between about 539° F. and about 650° F. and a pressure above about 80 pounds per square inch gage effective to convert a major proportion of the carbon monoxide, removing an effluent containing finely-divided catalyst from said reaction zone, separating finely-divided catalyst from said effluent and recycling separated catalyst to said reaction zone, and recovering from said effluent organic compounds as products of the process.

11. In a process for effecting the conversion of hydrogen and carbon monoxide to normally liquid organic compounds in the presence of a finely-divided alkali containing reduced iron synthesis catalyst in which process a total reaction feed mixture comprising hydrogen, carbon monoxide and carbon dioxide is passed through a reaction zone containing said finely-divided catalyst at a velocity effective to suspend the catalyst in the gases in the reaction zone at a reaction temperature between about 580 and about 650° F., a superatmospheric pressure of at least 80 pounds per square inch gage and at a space velocity equivalent to at least 3 standard cubic feet of carbon monoxide per pound of iron per hour, the improvement which comprises employing a total reaction feed mixture containing hydrogen, carbon monoxide and carbon dioxide present in a mol ratio of 8–2.5:1:1–2, the carbon dioxide content of said feed mixture being between about 10 and about 20 mol per cent and the carbon monoxide content of said feed mixture being between about 8 and about 12 mol per cent and maintaining the conversion of carbon monoxide at least 50 per cent per pass.

12. In a process for effecting the conversion of hydrogen and carbon monoxide to normally liquid organic compounds in the presence of a finely divided iron synthesis catalyst in which process a total reaction feed mixture comprising hydrogen, carbon monoxide and carbon dioxide is passed through a reaction zone containing said finely divided catalyst at a velocity effective to suspend the catalyst in the gases in the reaction zone at a temperature between about 450° F. and about 750° F., at a superatmospheric pressure of at least about 80 pounds per square inch gage and at a space velocity equivalent to at least about 3 standard cubic feet of carbon monoxide per pound of iron per hour, the improvement which comprises employing a total reaction feed mixture containing hydrogen, carbon monoxide and carbon dioxide, the carbon dioxide content of said feed mixture being between about 8 and about 30 mol per cent and the carbon monoxide content of said feed mixture being between about 8 and about 17 mol per cent and a hydrogen to carbon monoxide mol ratio of at least about 2.5:1 such that the formation of carbon dioxide and the tendency of the catalyst to agglomerate and deaerate in the reaction zone is minimized.

HENRY G. McGRATH.
LOUIS C. RUBIN.

REFERENCES CITED

The following references are of record in the file of this patent:

UNITED STATES PATENTS

| Number | Name | Date |
|---|---|---|
| 2,231,990 | Dreyfus | Feb. 18, 1941 |
| 2,248,099 | Linckh | July 8, 1941 |
| 2,251,554 | Sabel | Aug. 5, 1941 |
| 2,257,293 | Dreyfus | Sept. 30, 1941 |
| 2,287,092 | Duftschmid et al. | June 23, 1942 |
| 2,287,891 | Linckh | June 30, 1942 |
| 2,318,602 | Duftschmid et al. | May 11, 1943 |
| 2,436,957 | Eastman | Mar. 2, 1948 |
| 2,460,508 | Johnson | Feb. 1, 1949 |
| 2,461,570 | Roberts | Feb. 15, 1949 |
| 2,486,894 | Watson | Nov. 1, 1949 |